UNITED STATES PATENT OFFICE.

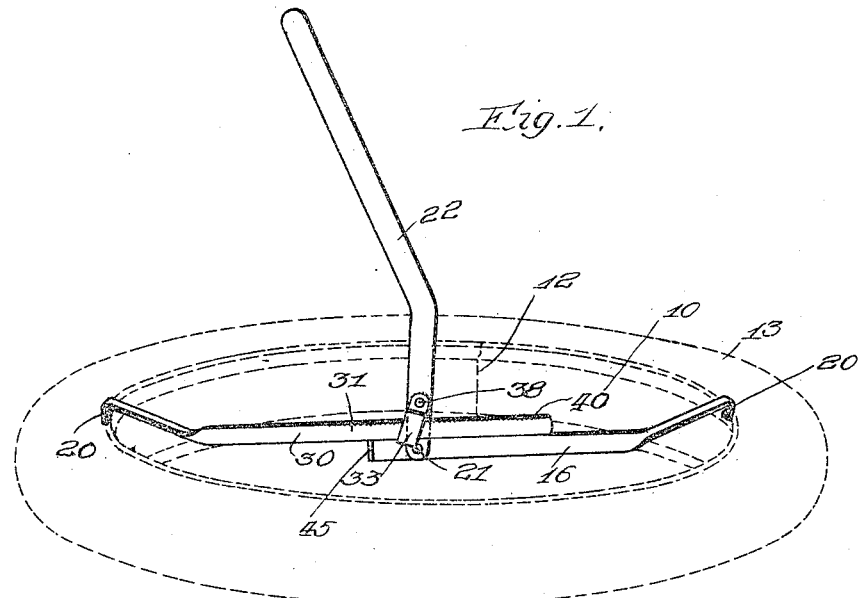

GUSTAVE E. LUNDBERG, OF KEWANEE, ILLINOIS.

RIM-TOOL FOR AUTOMOBILE-RIMS.

1,214,807.   Specification of Letters Patent.   Patented Feb. 6, 1917.

Application filed October 30, 1915. Serial No. 58,746.

*To all whom it may concern:*

Be it known that I, GUSTAVE E. LUNDBERG, a citizen of the United States, residing at 726 Henry street, in Kewanee, county of Henry, and State of Illinois, have invented new and useful Improvements in Rim-Tools for Automobile-Rims, of which the following is a specification.

This invention relates to improvements in rim tools for automobile rims, and more especially to a device designed for use in connection with the type of demountable or removable automobile rim which is divided transversely at one point and designed to be fitted into a tire or removed therefrom by expanding and contracting it in diameter. Many devices have been placed on the market intended for use in connection with such a rim, some of which work fairly well under the most favorable conditions. But in practical use it is often found that a tire is very badly stuck to a rim, so that a very great force is required to separate it therefrom, and even if a small section of it can be loosened from the tire at one end of the rim, it is still very difficult to loosen the remaining part. Also, it is often found that a new tire is too small to fit upon the rim intended for it without a considerable amount of stretching, and an enormous force is often required to stretch such a tire. These difficulties are particularly exasperating when it is attempted to change a tire on a rim in a hurry, as is frequently necessary, and this invention is designed therefore to provide a device better adapted for the purpose than any heretofore produced.

The device, briefly, comprises means for gripping the rim at two approximately diametrical points and applying a powerful force to contract the rim when it is desired to remove it from a tire, so that a large portion of the rim is pulled out of the tire; and conversely, in fitting the rim into the tire by forcing it out into its true circular form.

A device embodying the principles of the invention is shown in the accompanying drawings in which;

Figure 1 is a view of the complete device in perspective showing its method of use in removing a rim from a tire. Fig. 2 is a view in side elevation showing its method of use in applying a tire to a rim. Fig. 3 is a fragmentary view in side elevation on an enlarged scale showing more in detail the construction of the device.

As shown in said drawings 10 indicates a rim of a well known type, which is made in one continuous piece curved into circular form, with its ends meeting, as indicated at 12, and fitted with a tire 13. Such rims in practical use are also generally fitted with means for rigidly locking the two meeting ends of the rim together, but such means are not here shown and their particular construction, as well as the particular construction of the rim, is no part of the present invention.

The rim tool for contracting the rim so that it will be caused to separate from the tire comprises a flat bar 16 which is twisted through 90 degrees near one end, bent through a small angle, and then bent over sharply to form a hook 20 at its end. To this bar there is pivoted, as indicated at 21, the end of another bar 22, which forms a lever arm; and in parallel relation to the bar 16 there is arranged a similar bar 30 which is provided with notches 31 in its upper edge and engaged by a part 33 on the bar 22, so that by the swinging movement of the latter about its point of pivotal attachment to the bar 16, the two bars 16 and 30 are shifted endwise with relation to each other to draw their hooked ends together, or to separate them as may be required. The part 33 is made in the form of a clip which is pivoted to the lever arm 22 near its pivot point 21, as indicated at 38, and through it is a slot through which extends the bar 30. The bar 30 is provided with a number of notches 40 in its top edge so that the two bars can first be shifted endwise relatively to each other to provide for rims of varying diameters; and when the proper adjustment is secured, the movement of the lever 22 will cause the advancing edge of the clip 33 to engage in one of the notches, as indicated at 42, so that a further movement of the lever arm will draw the two hooked ends of the bars toward each other; or will spread them apart, according to the direction of movement.

In the operation of the device, when it is desired to remove a rim from a tire the two hooked ends are engaged with the rim, as shown in Fig. 1, at points some little distance removed from the point of division 12 of the rim; but not equi-distant therefrom, as if force were applied to contract the rim at points equi-distant from the place of division, the two ends of the rim might be braced against each other so that it would be difficult to separate them and contract the rim. With the device thus properly arranged a movement of the lever arm 22 to draw the two hooked ends of the bars toward each other will apply a powerful force to contract the rim, and a large portion of it will thus be sprung inward and pulled out of the tire. Conversely, when it is desired to apply a tire to the rim, the rim is first drawn together either with or without the use of the tool, and is then placed in position in the tire while its ends are overlapping and its diameter thus small enough to make it easily fitted into place. The tool is then simply reversed in operation and the two ends used to push against the rim at approximately diametrically opposite points to expand the rim into circular form within the tire. By reason of the bent places in the two bars 16 and 30 near their ends, or the off-setting of these two ends in effect, this operation will impose a down thrust on the middle part of the device which can rest against the floor or other surface on which the tire is laid, as indicated in Fig. 2; and the device is thus prevented from buckling. Likewise the inner end of the bar 16 is bent horizontally toward the bar 30 as indicated at 45 so that the twisting effect of the force applied by the lever 22 will not buckle the device in a horizontal plane, which is prevented by the end of the bent part 45 engaging against the adjacent surface of the bar 30.

I claim as my invention:

1. A tool for expanding yielding rims comprising a lever and two bars free and independent of each other and the lever, except for a pivotal connection of one to the lever and an engagement of the other to the lever by a lapping dog, the outer ends of said bars being offset toward the handle end of the lever so that when the rim is placed upon a level surface, outward movement of the bars tend to thrust them toward such surface.

2. A rim tool adapted to engage a yielding circular rim at two points to contract or expand the same, such rim tool comprising two bars arranged with their ends overlapping and their opposite or outer ends hook shaped to engage the rim to contract or expand the same, a swinging lever having its end pivotally connected directly to one of such bars near its inner end, a clip pivoted to the swinging lever near the pivoted end of the latter, such clip having an opening therethrough, and the second bar extending through such clip and having notches adapted for engagement thereby, whereby a movement of the swinging lever in either direction acts to bind the clip upon the notched bar and move the latter endwise to expand or contract the two hook shaped ends, said outer ends being offset toward the handle end of the lever so that a movement of the lever to spread such ends apart will exert a down thrust on the center part of the tool.

3. A rim tool adapted to engage a yielding circular rim at two points to contract or expand the same, such rim tool comprising two bars arranged with their ends overlapping and their opposite ends hook shaped to engage the rim to contract or expand the same, a swinging lever with its end pivoted to one of the bars, the latter bar having its inner end bent over toward the other bar and adapted to engage against the surface of such other bar, and a pivoted clip secured to the swinging lever near the pivoted end of the latter, embracing the second bar and having a dogging shoulder engaging said second bar, whereby a movement of the swinging lever in either direction acts to bind the clip upon the second bar and move the same endwise to expand or contract the two hook shaped ends.

In witness whereof, I have hereunto subscribed my name this 25th day of October, 1915.

GUSTAVE E. LUNDBERG.